United States Patent
Reese et al.

(10) Patent No.: US 11,076,604 B2
(45) Date of Patent: Aug. 3, 2021

(54) CONVECTION OVEN

(71) Applicant: Duke Manufacturing Co., St. Louis, MO (US)

(72) Inventors: Robert J. Reese, Edwardsville, IL (US); James W. Bigott, Fenton, MO (US); Amit Pachauri, St. Louis, MO (US); Kim Charles Fietsam, New Athens, IL (US); Gregory Glen Stettes, Pacific, MO (US); Daryl R. Monroe, Granite City, IL (US)

(73) Assignee: DUKE MANUFACTURING CO., St. Louis, MO (US)

(*) Notice: Subject to any disclaimer, the term of this patent is extended or adjusted under 35 U.S.C. 154(b) by 347 days.

(21) Appl. No.: 15/957,271

(22) Filed: Apr. 19, 2018

(65) Prior Publication Data
US 2018/0235239 A1 Aug. 23, 2018

Related U.S. Application Data

(63) Continuation of application No. PCT/IB2016/056360, filed on Oct. 21, 2016.
(Continued)

(51) Int. Cl.
*A21B 1/26* (2006.01)
*A21C 13/00* (2006.01)
(Continued)

(52) U.S. Cl.
CPC .............. *A21B 1/26* (2013.01); *A21C 13/00* (2013.01); *F04D 29/422* (2013.01);
(Continued)

(58) Field of Classification Search
CPC ......... A21B 1/26; A21C 13/00; F04D 29/422; F04D 29/4246; F24C 7/06; F24C 15/2007; F24C 15/322; F24C 15/327
See application file for complete search history.

(56) References Cited

U.S. PATENT DOCUMENTS

2,491,420 A    12/1949  Scott
3,911,893 A *  10/1975  Baker ................... F24C 15/006
                                                    126/21 A
(Continued)

FOREIGN PATENT DOCUMENTS

DE     7238931       *  3/1973
DE     7238931 U       3/1973
(Continued)

OTHER PUBLICATIONS

International Search Report, PCT/IB2016/056360, dated Mar. 23, 2017, 8 pages.
(Continued)

*Primary Examiner* — Shawntina T Fuqua
(74) *Attorney, Agent, or Firm* — Stinson LLP

(57) ABSTRACT

Ovens and methods for preparing food. An oven includes a cabinet and an oven chamber in the cabinet. A fan is provided for moving gas in the oven. The oven can include a fan scroll housing having multiple fan discharge ducts defining respective gas flow paths from the fan. The oven can include a turning vane configured for turning gas flow and for heating the gas flow.

24 Claims, 14 Drawing Sheets

Related U.S. Application Data

(60) Provisional application No. 62/245,607, filed on Oct. 23, 2015.

(51) Int. Cl.
  *F04D 29/42* (2006.01)
  *F24C 7/06* (2006.01)
  *F24C 15/20* (2006.01)
  *F24C 15/32* (2006.01)

(52) U.S. Cl.
  CPC ............ *F04D 29/4246* (2013.01); *F24C 7/06* (2013.01); *F24C 15/2007* (2013.01); *F24C 15/322* (2013.01); *F24C 15/327* (2013.01)

(56) References Cited

U.S. PATENT DOCUMENTS

| | | | |
|---|---|---|---|
| 4,512,327 A | 4/1985 | Stiegler | |
| 4,722,683 A | 2/1988 | Royer | |
| 5,340,275 A | 8/1994 | Eisinger | |
| 6,564,699 B1 | 5/2003 | Vincente et al. | |
| 2006/0027560 A1* | 2/2006 | Song | F24C 15/322 219/400 |
| 2010/0301034 A1* | 12/2010 | Greenwood | F24C 7/006 219/400 |
| 2014/0054281 A1 | 2/2014 | Greenwood et al. | |
| 2015/0147167 A1 | 5/2015 | DeFilippis | |
| 2016/0153668 A1 | 6/2016 | Greenwood et al. | |

FOREIGN PATENT DOCUMENTS

| | | | |
|---|---|---|---|
| DE | 2339446 A | | 2/1975 |
| DE | 2557867 A1 | | 6/1977 |
| DE | 19831087 A1 | | 1/2000 |
| DE | 102010029308 | * | 12/2011 |
| DE | 102010029308 A1 | | 12/2011 |
| EP | 0 611 524 A1 | | 8/1994 |
| FR | 1515884 A | | 3/1968 |
| GB | 2 136 110 A | | 9/1984 |
| GB | 2136110 | * | 9/1984 |
| JP | S58160744 A | | 9/1983 |
| JP | S59155412 U | | 10/1984 |
| JP | 2005265227 A | | 9/2005 |
| WO | 2014/190274 A1 | | 11/2014 |

OTHER PUBLICATIONS

Written Opinion, PCT/IB2016/056360, dated Mar. 23, 2017, 11 pages.

Extended Search Report relating to European Patent Application No. 18214958.3 dated Apr. 16, 2019, 9 pages.

* cited by examiner

US 11,076,604 B2

CONVECTION OVEN

REFERENCE TO RELATED APPLICATIONS

This application is a U.S. Continuation Application of International Patent Application No. PCT/IB2016/056360, filed Oct. 21, 2016, and claims the benefit of priority of U.S. Provisional Application No. 62/245,607, filed Oct. 23, 2015, the entire disclosures of which are hereby incorporated by reference.

FIELD

The present disclosure generally relates to ovens, and more particularly to convection ovens and associated components and methods.

BACKGROUND

Certain types of food products are especially difficult to cook quickly and uniformly. Bread is one such product. Proofing and baking are two operations commonly used in bread making to achieve desired bread characteristics. "Proofing" is a process of yeast fermentation which increases the volume or "rise" of dough, and an oven used to "proof" bread is often referred to as a "proofer" or "proofer oven." After the dough is proofed, it is baked into bread. For example, an oven may include separate proofing and baking cavities such that the dough can be proofed in the proofer cavity before being moved to and baked in the baking cavity.

SUMMARY

One aspect of the present disclosure is directed to a convection oven. The oven includes a cabinet having a top, bottom, front, rear, left side, and right side. The oven includes an oven chamber in the cabinet sized for receiving food. The oven includes recirculation ducting for recirculating gas from the oven chamber back to the oven chamber. The recirculation ducting includes a fan scroll housing. A centrifugal fan is in the fan scroll housing for moving gas from the recirculation ducting to the oven chamber. The centrifugal fan has a fan axis about which the fan is rotatable in a rotation direction to move gas radially from the fan in the fan scroll housing. A heating mechanism is in the cabinet for heating the gas. The fan scroll housing includes multiple fan discharge ducts defining respective gas flow paths from the fan. The fan scroll housing defines multiple cutoffs adjacent the fan for dividing gas flow from the fan to the fan discharge ducts. Each fan discharge duct includes opposite first and second discharge duct walls downstream from respective cutoffs. Each first discharge duct wall includes a volute wall section having a concave surface facing the gas flow path of the respective fan discharge duct. Each volute wall section extends at least partially around the centrifugal fan in the rotation direction and increases in distance from the fan axis as the volute wall section extends in the rotation direction around the centrifugal fan.

Another aspect of the present disclosure is directed to a convection oven. The oven includes a cabinet having a top, bottom, front, rear, left side, and right side. The oven includes an oven chamber in the cabinet sized for receiving food. The oven includes at least one outlet for delivering gas to the oven chamber. The oven includes at least one exhaust for exhausting gas from the oven chamber. The oven includes recirculation ducting defining a recirculation gas flow path for flow of gas from the at least one exhaust to the at least one outlet for recirculating gas from the oven chamber back to the oven chamber. A fan is in the recirculation ducting for moving gas along the recirculation gas flow path. At least one turning vane is in the recirculation ducting. The turning vane is configured for turning gas flow in the recirculation ducting from a first direction toward a second direction transverse to the first direction for following the gas flow path. The turning vane includes a heating mechanism for heating gas in the recirculation ducting.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
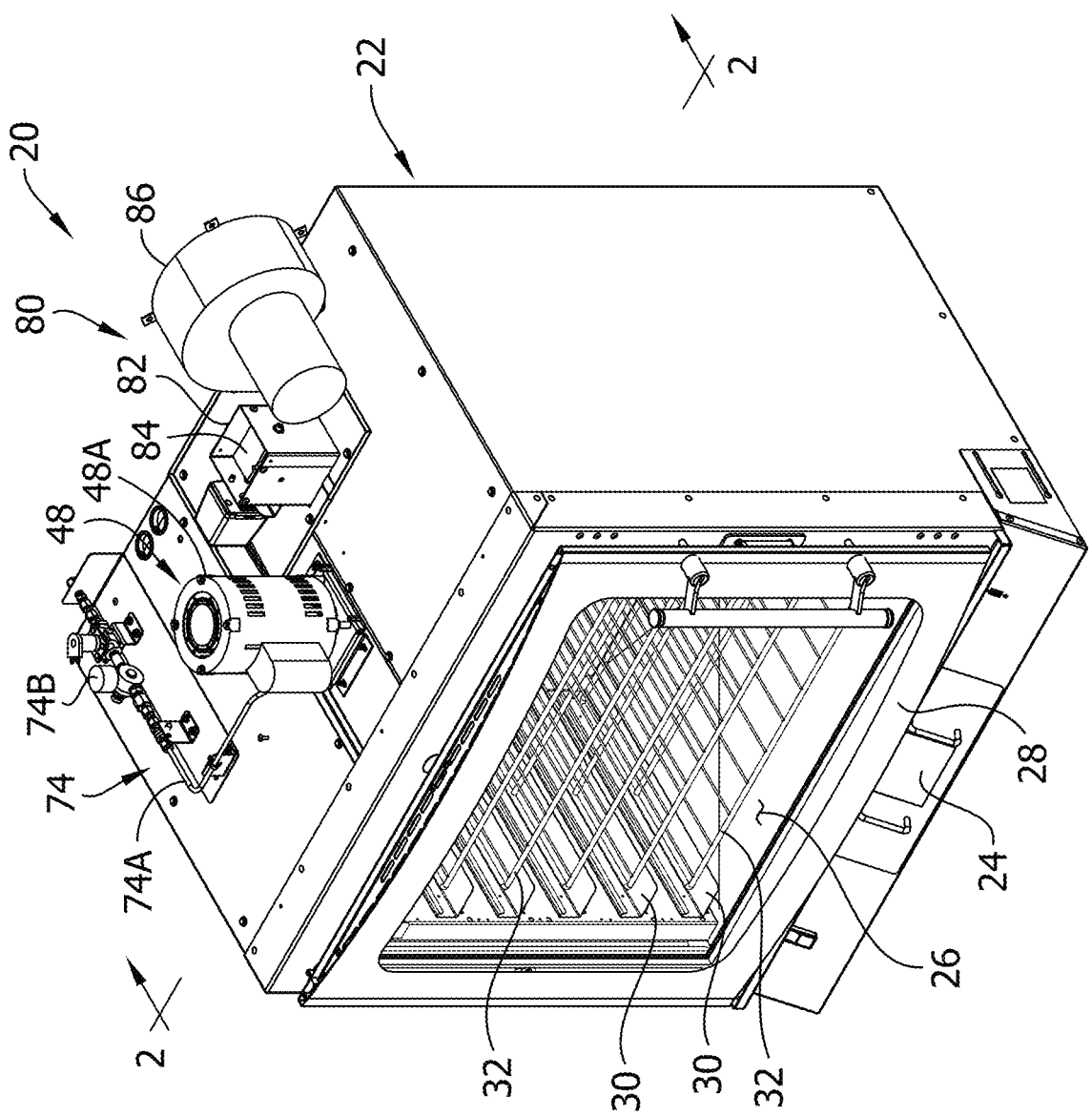
FIG. 1 is a perspective of a convection oven embodying aspects of the present invention, shrouds and covers of the oven not being shown.

Referring to the drawings, FIG. 1 illustrates an oven embodying aspects of the present invention, indicated generally by the reference number 20. The oven 20 includes a cabinet, generally designated by the reference number 22. The cabinet has a top, bottom, front, rear, and opposite left and right sides. The oven includes a user interface 24 adjacent the bottom of the cabinet 22 for controlling operation of the oven. The oven 20 can be used for cooking food products, such as bread, among other things. For example, the oven 20 can be used for proofing and/or baking dough. Other configurations can be used without departing from the scope of the present invention.

Figure 2:
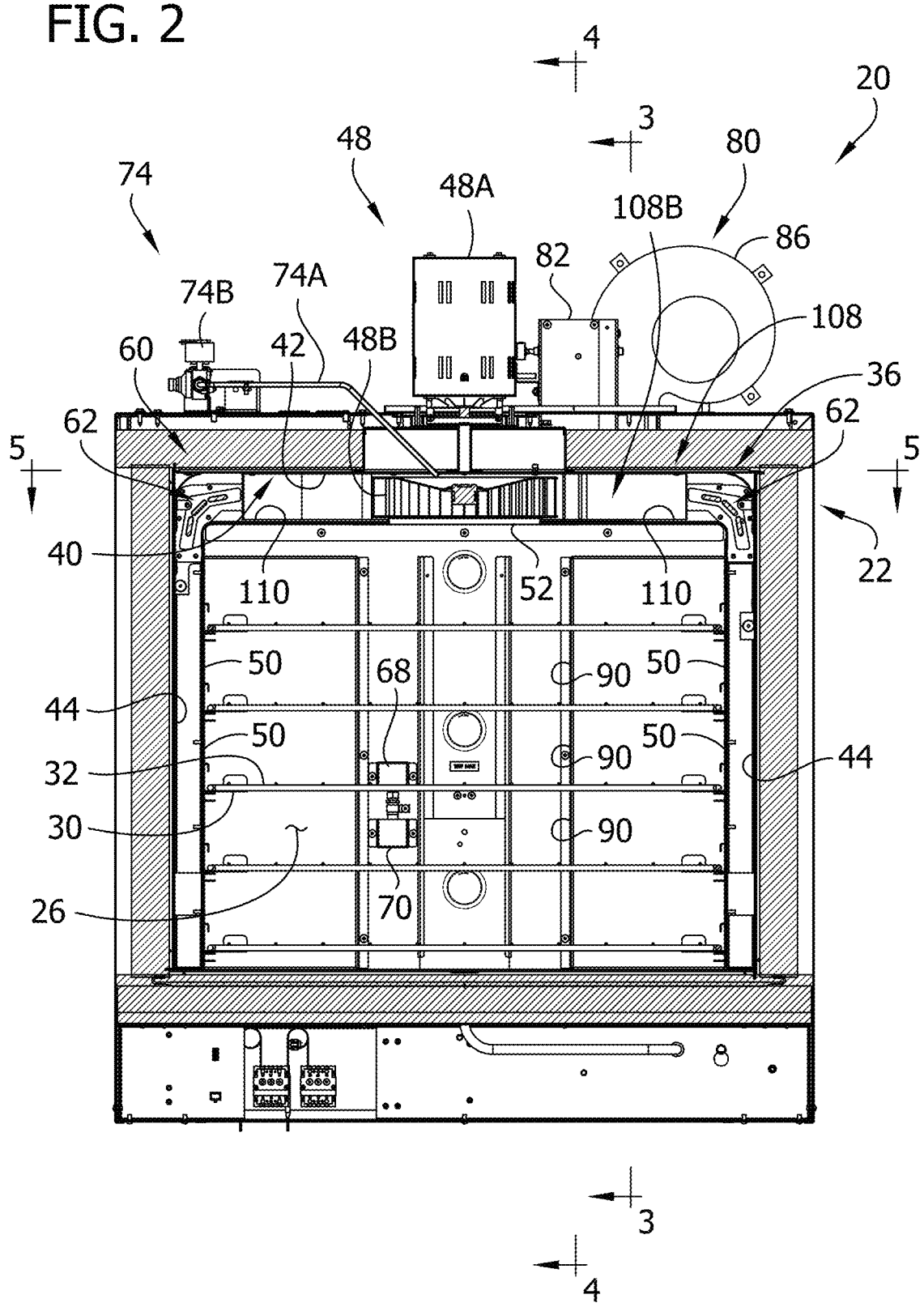
FIG. 2 is a section of the oven of FIG. 1 taken in the plane including line 2-2 of FIG. 1.
Figure 3:
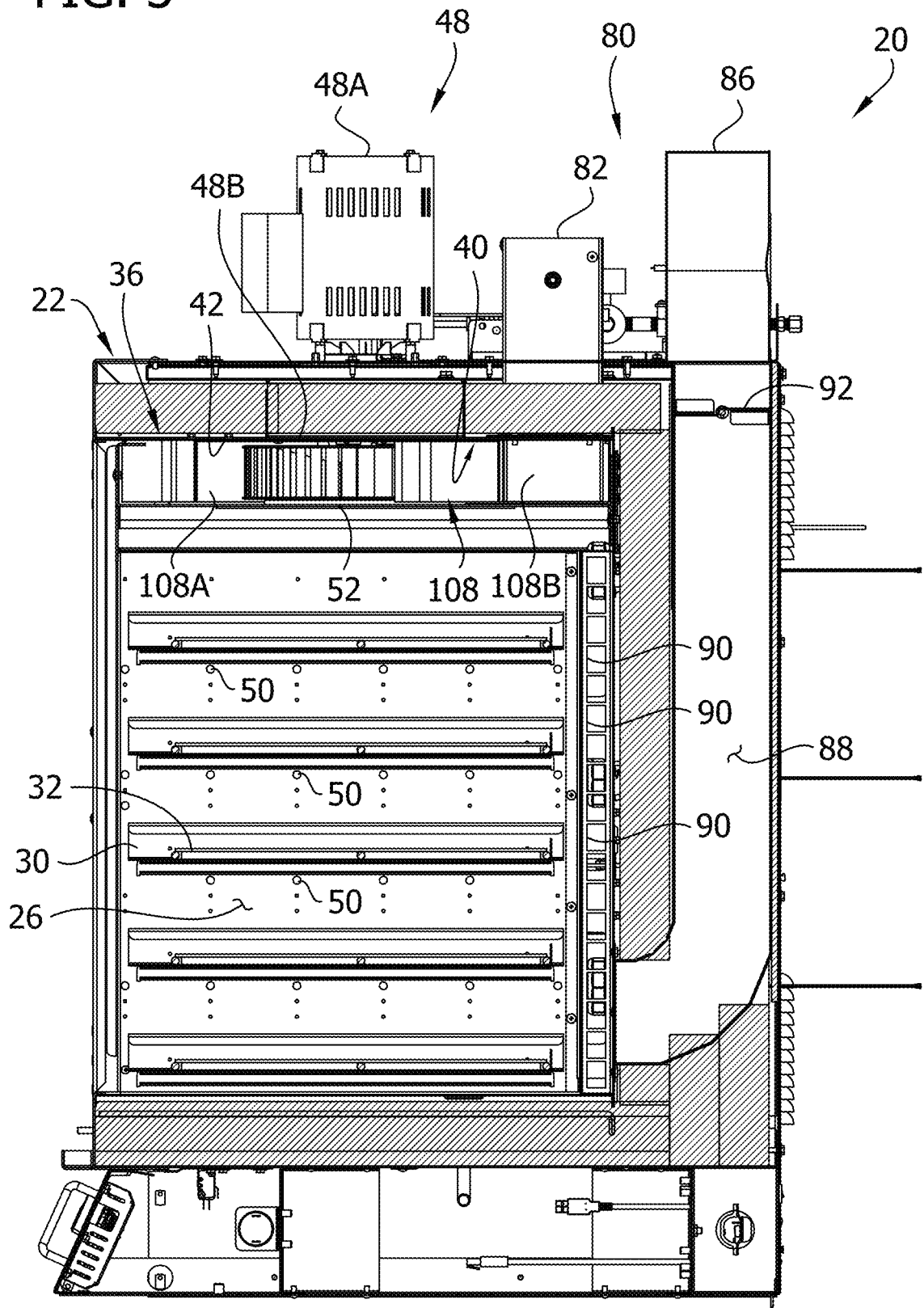
FIG. 3 is a section of the oven taken in the plane including line 3-3 of FIG. 2.

Referring to FIGS. 2 and 3, the oven 20 comprises an oven chamber 26 defined by a top wall, a bottom wall, opposite side walls, and a back wall. The chamber 26 is sized for receiving food to be cooked and is accessible by opening a door 28 which closes an open front of the front chamber. The door 28 is shown in FIG. 1 but is removed from the oven in the remainder of the figures. Several shelf supports 30 are secured to the side walls of the chamber for supporting a number of removable food shelves 32 in the chamber. In the illustrated embodiment, five levels of shelf supports 30 are provided, and each shelf 32 is sized to hold two of pans of dough, which can hold five dough pieces per pan, for a total of 50 pieces in the chamber. It will be understood that the number and size of the shelves 32 can vary without departing from the scope of the present invention. The chamber is surrounded by an outer housing, generally designated 36, having a top wall, a bottom wall, opposite side walls, and a back wall. The top and side walls of the housing 36 are spaced from respective walls of the cooking chamber 26 to provide recirculation ducting 40 defining a recirculation flow path for circulating gas from the cooking chamber 26 back to the cooking chamber. As shown in FIG. 2, the recirculation ducting 40 comprises an upper duct 42 above the cooking chamber and side ducts 44 to opposite left and right sides of the cooking chamber 26. Other ducting configurations can be used without departing from the scope of the present invention.

A blower, generally indicated at 48, is provided at an upper end of the cabinet 22 for circulating gas through the recirculation ducting 40. In the illustrated embodiment, gas enters the cooking chamber 26 from the left and right side ducts 44 through a plurality of entry openings (outlets) 50 in the side walls of the chamber (see FIGS. 2 and 3) and exits the chamber to the upper duct 42 through one or more exhaust openings 52 in the top wall of the chamber below the blower 48. The blower 48 comprises a blower motor 48A and a centrifugal fan or fan wheel 48B. The blower motor 48A drives rotation of the fan wheel 48B via an output shaft, which rotates in a bearing about a generally vertical fan axis. The fan wheel 48B is located in the upper duct 42 of the air recirculation ducting adjacent (e.g., immediately above) the exhaust opening 52 in the top wall of the cooking chamber 26. The blower motor 48A is operable to rotate the fan wheel 48B in a rotation direction (e.g., counter-clockwise as viewed in FIG. 6) to circulate air through the recirculation ducting 40 and cooking chamber 26 at velocities and flow rates suitable for proofing and/or baking dough. The fan wheel 48B includes an upper hub and a plurality of blades. Rotation of the fan wheel 48B creates suction at a suction side of the fan wheel (i.e., a lower portion of the fan wheel opposite the hub adjacent the exhaust opening) to pull gas from the cooking chamber 26 through the exhaust opening 52. Gas is expelled from the fan wheel 48B radially from the fan wheel to circulate gas through the recirculation ducting 40 to the cooking chamber. For example, the fan can rotate at about 300-1800 rpm. For proofing, the fan 48B can be rotated in the inclusive range of 300-700 rpm, such as about 545 rpm. For baking, the fan 48B can be rotated in the inclusive range of 1,300-1,700 rpm, such as about 1550 rpm. Exemplary velocities for baking include 2,000-4,000 ft/min at the fan output, and 1,900-2,700 ft/min at the entry openings 50. Additional aspects of the recirculation ducting 40 will be described below.

A heating system 60 is provided for heating the gas delivered to the chamber 26. The heating system 60 heats the gas in the recirculation ducting 40 before the gas is recirculated back to the chamber 26 via the recirculation ducting. However, other configurations can be used without departing from the scope of the present invention. In the illustrated embodiment, the heating system 60 includes one or more heating mechanisms 62. In the illustrated embodiment, two heating mechanisms 62 are provided, and they are located at respective intersections of the upper duct 42 with the left and right side ducts 44. Other heating system arrangements can be used without departing from the scope of the present invention. Additional aspects of the heating system 60 will be described below.

The oven can include various sensors for indicating to a control system 66 (FIG. 14) of the oven 20 relevant aspects of proofing and/or baking operations. For example, a temperature sensor 68 (FIG. 2) is provided in the chamber 26 for sensing the temperature in the chamber and indicating the sensed temperature to the control system 66. A relative humidity sensor 70 (FIG. 2) is provided in the chamber 26 for sensing and communicating to the control system 66 the relative humidity in the chamber.

Referring to FIGS. 1 and 2, the oven 20 includes a water system, generally indicated by the reference number 74 adapted for introducing water into the recirculation ducting 40. The water system 74 can be used in operations such as dough proofing for increasing humidity in the oven chamber 26. For example, water can be injected during a proofing cycle for creating steam in the recirculation ducting 40 that is delivered to the oven chamber 26. In the illustrated embodiment, the water system 74 includes a water delivery conduit 74A and a solenoid valve 74B positioned along the conduit for selectively permitting water to be delivered into the recirculation ducting 40. Water is introduced into the recirculation ducting 40 through an outlet of the conduit 74A above the fan wheel 48B. For example, at least some of the water can flash to steam upon contacting the fan wheel 48B. Some water can form a film on the fan wheel 48B and be flung radially from the fan wheel to change to steam by heat of the walls of the recirculation ducting 40 and/or heating mechanisms 62. Other configurations of water systems, and other sources of steam, can be used without departing from the scope of the present invention. For example, components of the water system 74, such as the valve 74B, can be omitted without departing from the scope of the present invention.

Figure 4:
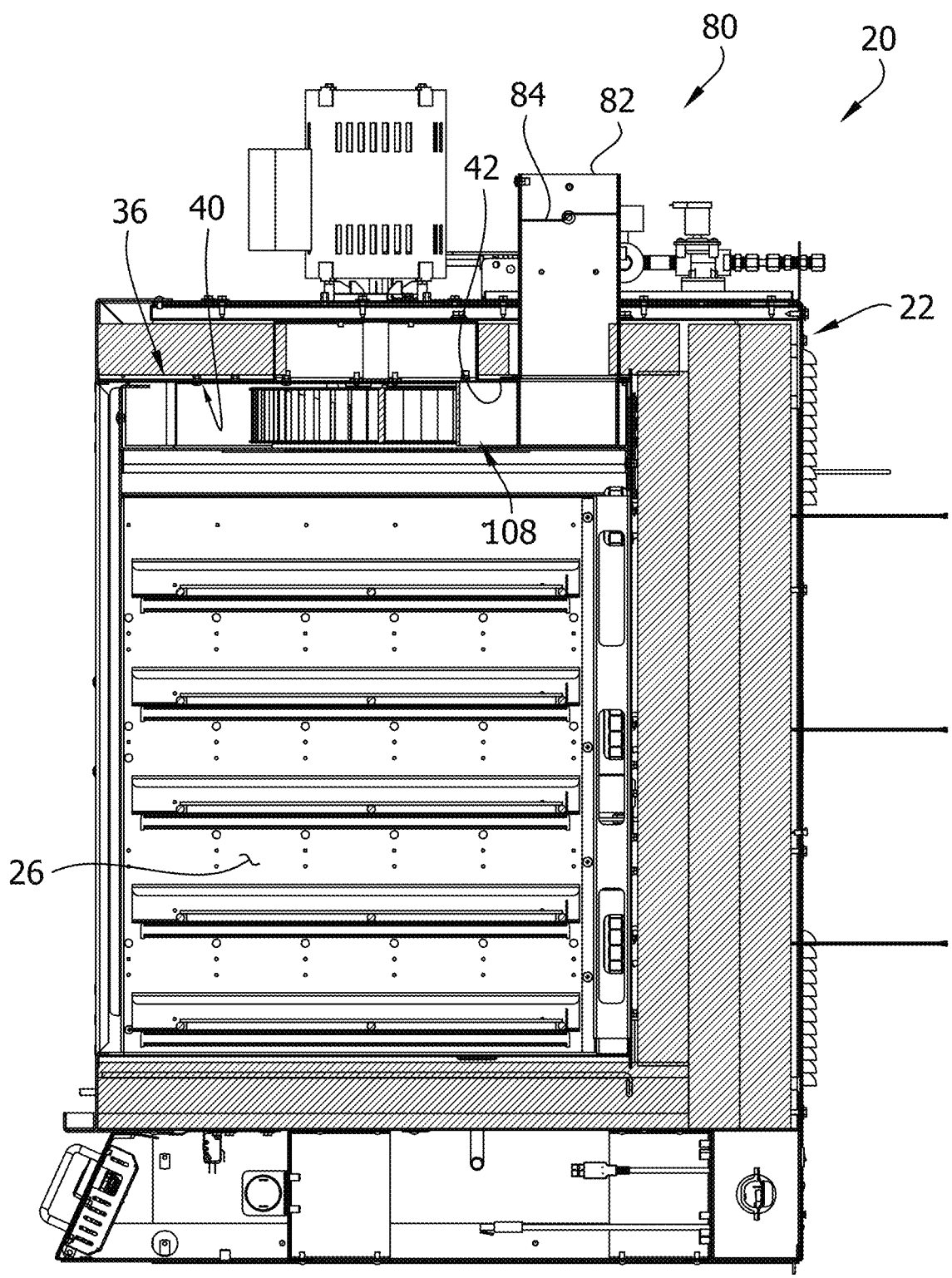
FIG. 4 is a section of the oven taken in the plane including line 4-4 of FIG. 2.

Referring to FIGS. 1, 2, and 4, a vent system 80 of the oven 20 includes a vent conduit or flue 82 for permitting gas to escape from the oven chamber 26 to ambient. The chamber 26 and gas recirculation ducting 40 is a generally closed system in which substantially the same gas recirculates over and over. However, at various times, it may be desired to passively or actively vent the system. The flue 82 extends from an inlet end communicating with the chamber 26 to an outlet end above the chamber. A valve 84 is provided in the flue 82 adjacent its outlet end and is adapted for blocking the flue to prevent venting. The valve 84 is selectively movable by a solenoid for moving the valve between an open position and a closed position. For example, it may be desirable during proofing and/or baking operations, such as while injecting steam into the chamber 26, to close the flue 82 to prevent heat and/or moisture from escaping the chamber. Referring to FIGS. 1-3, the vent system 80 also includes a vent blower 86 mounted above the chamber 26. When the valve 84 is open to vent the chamber, the blower 86 can be used to increase gas pressure inside the chamber to cause hot and/or moisture laden gas to exhaust through the flue 82. The blower 86 communicates with the chamber 26 via vent ducting 88 (defining a vent gas flow path) that has outlets 90 (FIGS. 2 and 3) connected to the chamber 26 and arranged for introducing vent gas directly into the chamber relatively uniformly. A valve 92 is provided in the vent ducting 88 for preventing backflow of gas when the vent blower 86 is not in use. For example, when a high-humidity operation such as proofing is finished, it may be desirable to actively vent the chamber 26 using the vent blower 86 for generating suitable conditions in the chamber for the baking cycle. Moreover, when a high-heat operation such as baking is finished, it may be desirable to actively vent the chamber 26 using the vent blower 86 for decreasing the temperature in the chamber for a subsequent proofing cycle. The vent blower 86 can also be used at any time to cool the oven 20 to prepare for maintenance of service purposes.

Figure 14:
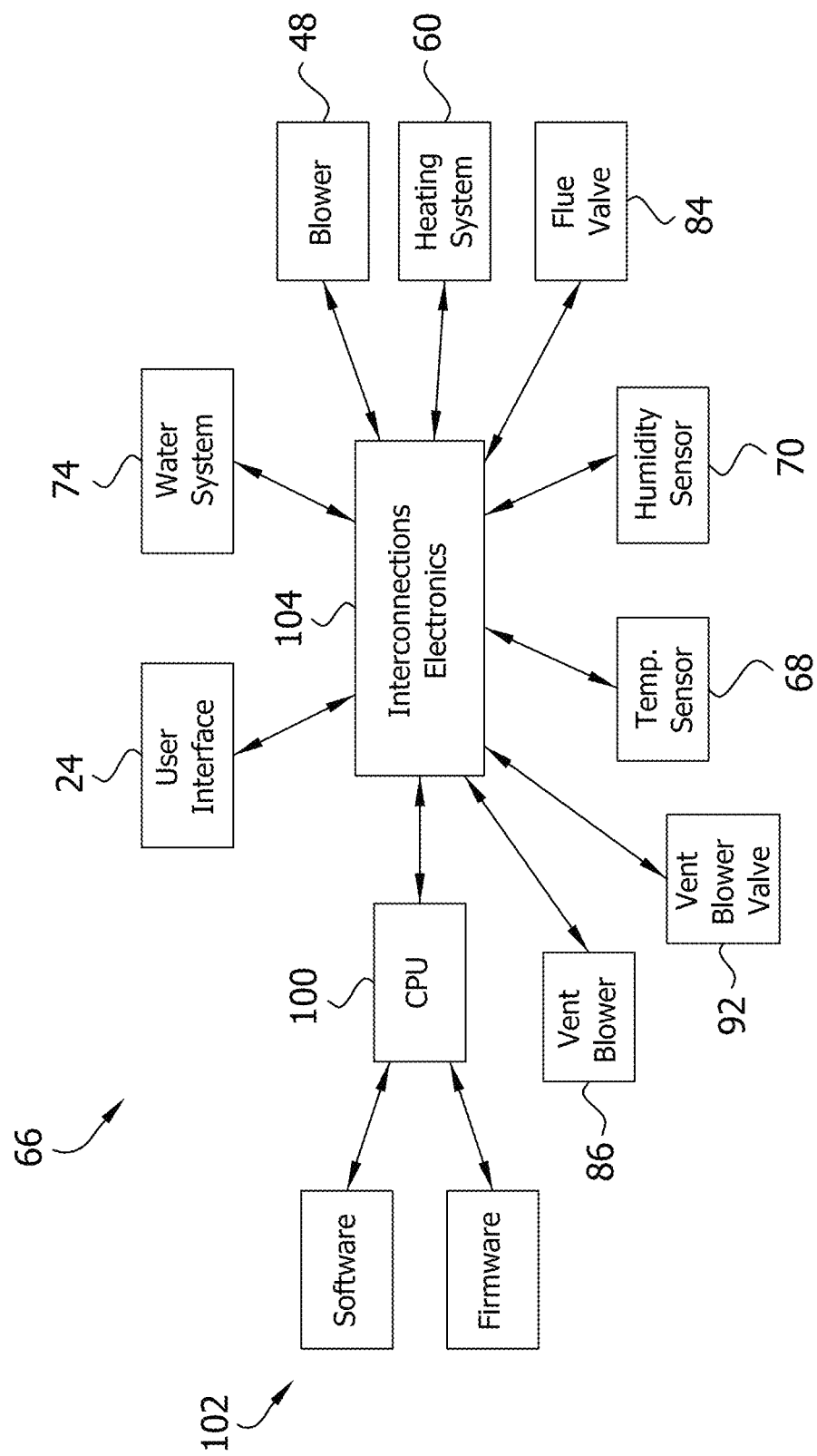
FIG. 14 is a schematic of a control system of the oven.

As shown schematically in FIG. 14, the control system 66 for the oven includes a central processing unit (CPU) 100, a computer-readable tangible storage medium 102 (e.g., including forms of storage such as software and firmware), and the user interface 24. The CPU 100 can be a microprocessor or the like. The control system 66 includes interconnection electronics 104 that operatively connect the various components of the control system with other components of the oven 20, such as the water system 74, flue valve 84, blower 48, heating system 60, and temperature and relative humidity sensors 68, 70. The CPU 100 is adapted for reading and executing instructions stored in the storage medium 102, and is responsive to the user interface 24, for controlling the various components and systems of the oven 20. A user can enter or modify instructions stored on the storage medium 102 via the user interface 24. In the illustrated embodiment, the user interface 24 is a touch screen. Other types of user interfaces can be used without departing from the present invention. The user interface 24 provides command signals via the interconnection electronics 104 to the CPU 100. The command signals can include changes to the parameters (e.g., time, temperature, humidity, etc.) stored in the tangible storage medium 102. The CPU 100 responds to the command signals and provides control signals corresponding thereto via the interconnection electronics 104 to the various components and systems of the oven 20. For example, the interconnection electronics 104 can include electrical or fiber optic lines or wireless communication devices.

Figure 5:
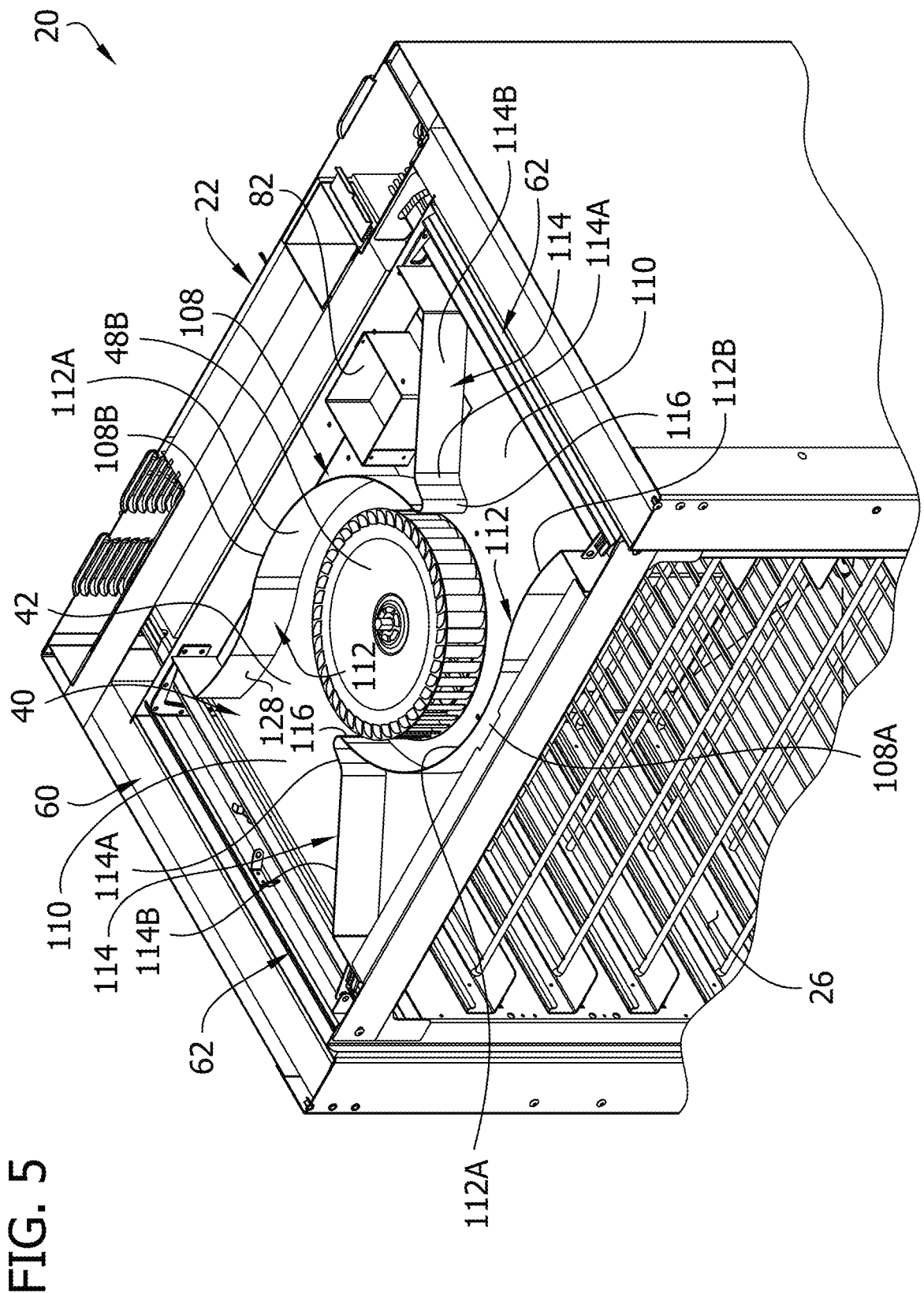
FIG. 5 is a fragmentary perspective section of the oven taken in the plane including line 5-5 of FIG. 2.
Figure 6:
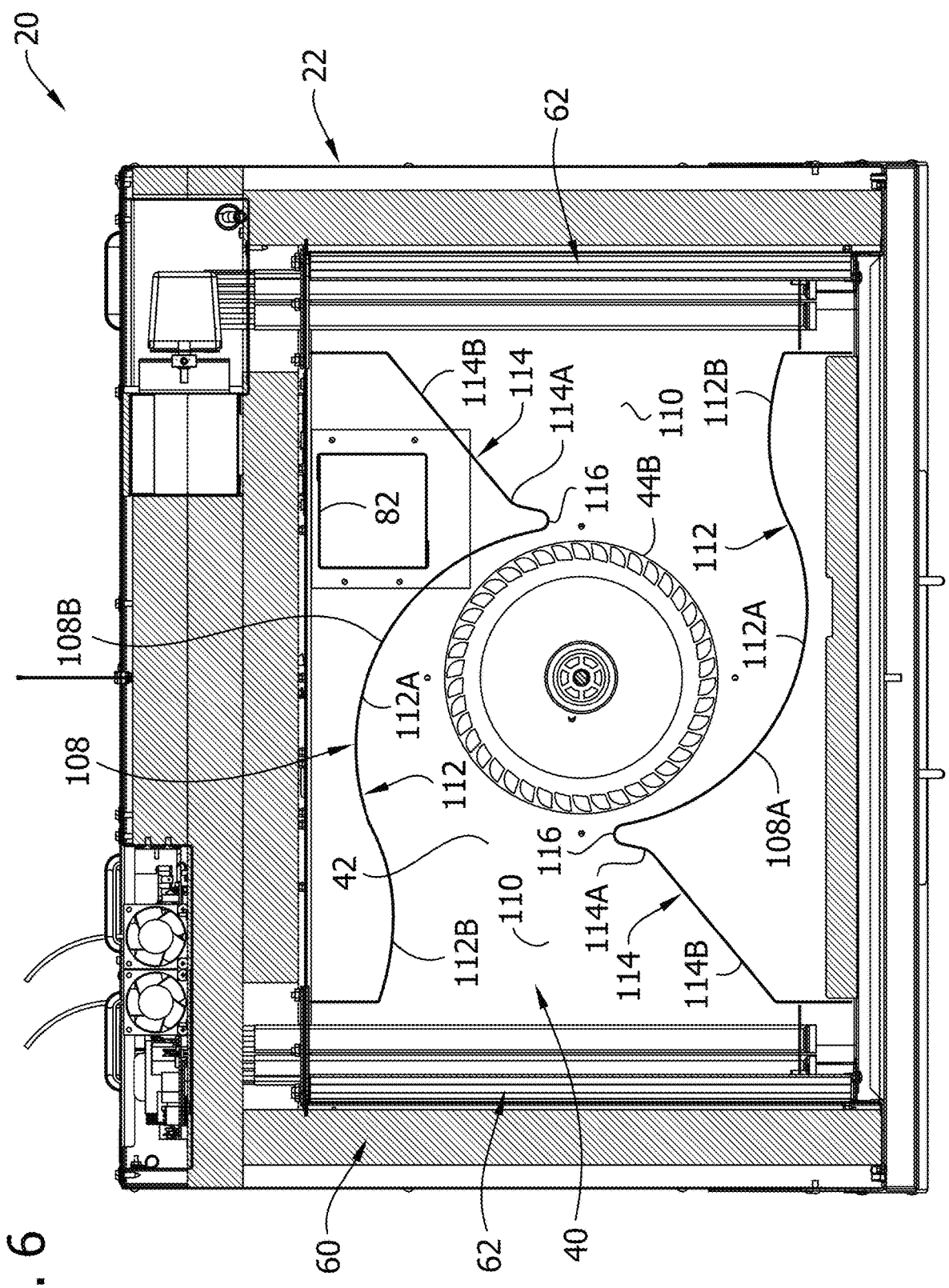
FIG. 6 is a view similar to FIG. 5 but showing the section from the top.

In one aspect of the oven, the recirculation ducting 40 is configured to provide substantially uniform gas flow to the oven chamber 26 for accomplishing substantially even cooking of food therein. Various aspects of the oven 20 can contribute to improved uniformity of the gas flow. In one aspect, the upper duct 42 is configured to provide relatively uniform gas flow from the fan to the left and right side ducts 44. Referring to FIGS. 5 and 6, the gas recirculation ducting 40 comprises a fan scroll housing, indicated generally by 108, partially defining the gas recirculation flow path. The fan 48B is positioned in the fan scroll housing 108. In the illustrated embodiment, the fan scroll housing 108 is formed by a forward scroll wall 108A and a rear scroll wall 108B in the upper duct 42 and extending between left and right sides of the upper duct. The fan scroll housing 108 is also formed by portions of the top wall of the chamber 26 and the top wall of the outer housing 36 spanning the distance between the scroll walls 108A, 108B. The fan scroll housing 108 is configured to direct gas flow from the fan 48B such that the gas is relatively uniformly delivered to the left and right side ducts 44 from the fan scroll housing. The fan scroll housing 108 defines left and right fan discharge ducts 110 having outlets in fluid communication with the respective left and right side ducts 44. It will be appreciated that additional fan discharge ducts could be provided without departing from the scope of the present invention. Referring to FIG. 6, left portions of the forward and rear scroll walls 108A, 108B form discharge duct walls 112, 114 of the left fan discharge duct 110, and right portions of the forward and rear scroll walls 108A, 108B form discharge duct walls 112, 114 of the right fan discharge duct 110. The forward and rear scroll walls 118A, 118B have cutoff sections defining cutoffs 116 of the fan scroll housing. The cutoffs 116 are positioned adjacent the fan 48B and are configured for dividing flow of gas from the fan to the left and right fan discharge ducts 110. The discharge duct walls 112, 114 of the left and right discharge ducts 110 extend toward the left and right side ducts 44, respectively, from the cutoffs 116. The cutoffs 116 have convex surfaces facing the recirculation gas flow path.

Still referring to FIG. 6, the discharge duct walls 112, 114 are configured to direct gas flow from the centrifugal fan 48B in a relatively uniform fashion. The configuration of the right fan discharge duct 110 will be described in further detail, with the understanding that the left fan discharge duct 110 has a similar but mirror image configuration. The forward discharge duct wall 112 of the right discharge duct 110 includes a volute wall section 112A extending downstream from the forward cutoff 116. The volute wall section 112A has a concave surface facing the gas flow path of the right fan discharge duct 110. The volute wall section 112A extends partially around the fan 48A in the direction of rotation of the fan (counter-clockwise in FIG. 6), and the volute wall section increases in distance from the fan rotation axis as the volute wall section extends in the rotation direction around the fan. The forward discharge duct wall 112 includes a hump wall section 112B extending downstream from the volute wall section 112A. The hump wall section 112B bulges inward with respect to the gas flow path of the right fan discharge duct 110. The hump wall section 112B has a convex surface facing the gas flow path of the right fan discharge duct 110. The rear discharge duct wall 114 of the right fan discharge duct 110 includes an eddy wall section 114A extending downstream from the rear cutoff 116. The eddy wall section 114A is configured to create an eddy in the gas flow path downstream from the rear cutoff 116, and in the illustrated embodiment, immediately downstream from the rear cutoff. The eddy wall section 114A has a concave surface facing the gas flow path of the right fan discharge duct 110. The rear discharge duct wall 114 also includes a diffuser wall section 114B extending downstream from the eddy wall section 114A. In the illustrated embodiment, the diffuser wall section 114B has a generally planar surface facing the gas flow path of the right fan discharge duct 110. The diffuser wall section 114B extends away from the eddy wall section 114A and the hump wall section 112B on the opposite side of the right discharge duct 110. The diffuser wall section 114B and the hump wall section 112B extend away from each other adjacent the outlet of the right fan discharge duct 110 to broaden or diffuse the gas flow to substantially a full length or depth of the right side duct 44.

It will be appreciated that the concave and convex surfaces described herein are shown as being curved, but other configurations of concave and convex surfaces can be used without departing from the scope of the present invention. For example, the concave and/or convex surfaces could define pointed peaks or valleys instead of curved peaks or valleys, without departing from the scope of the present invention.

Figure 10:
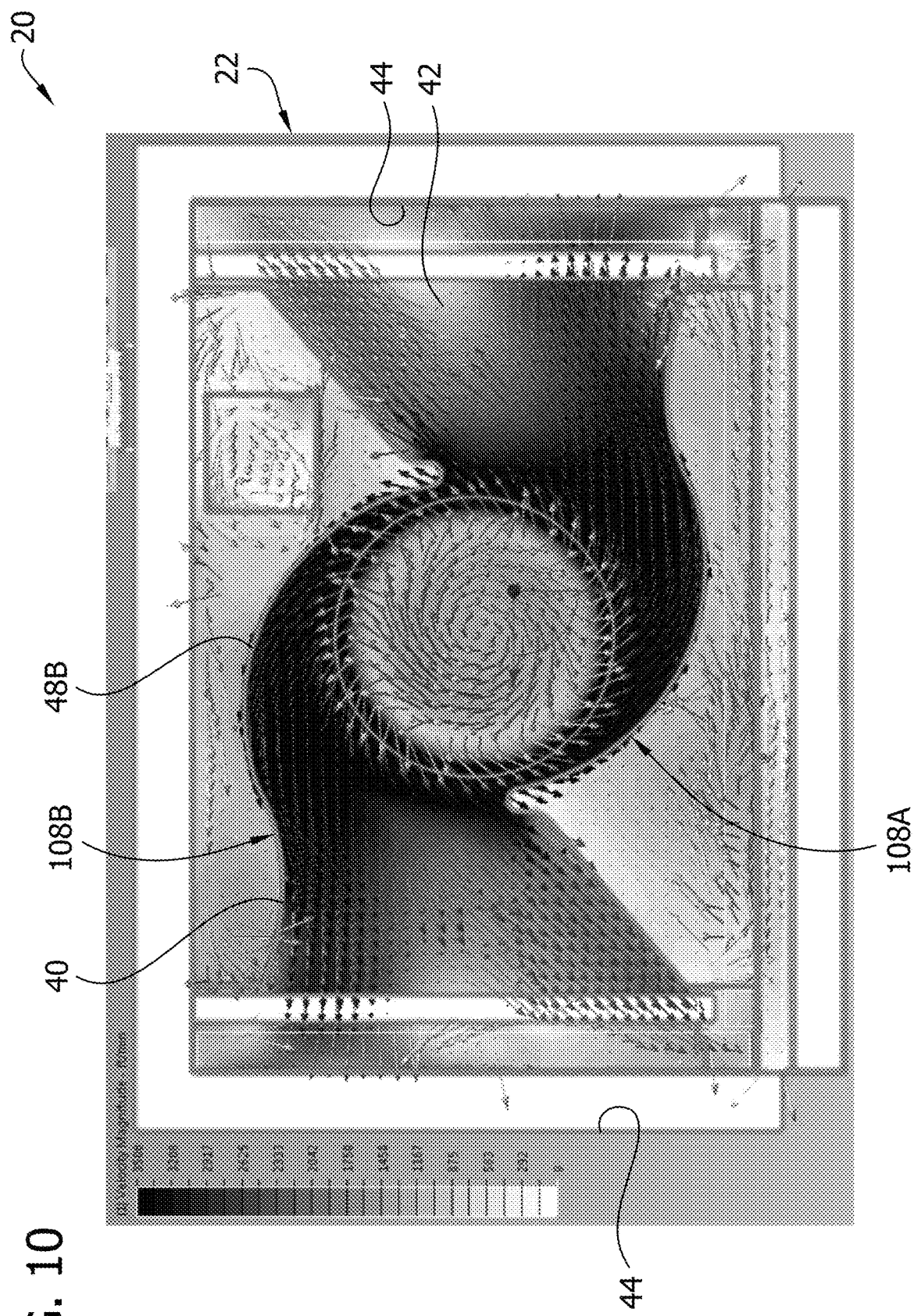
FIG. 10 is a section of the oven similar to FIG. 6 showing a gas velocity plot.
Figure 11:
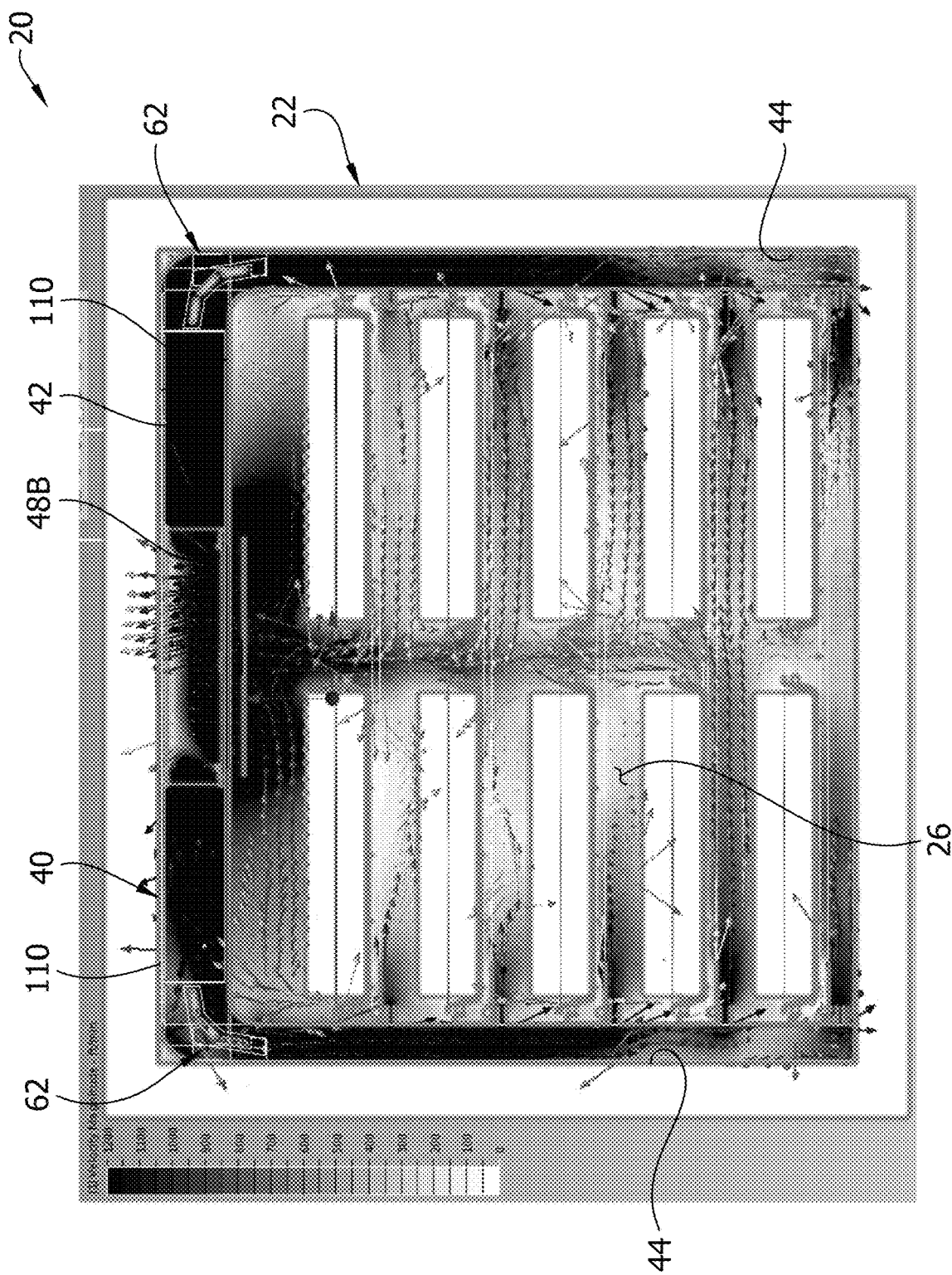
FIG. 11 is a section of the oven similar to FIG. 2 showing a gas velocity plot.
Figure 12:
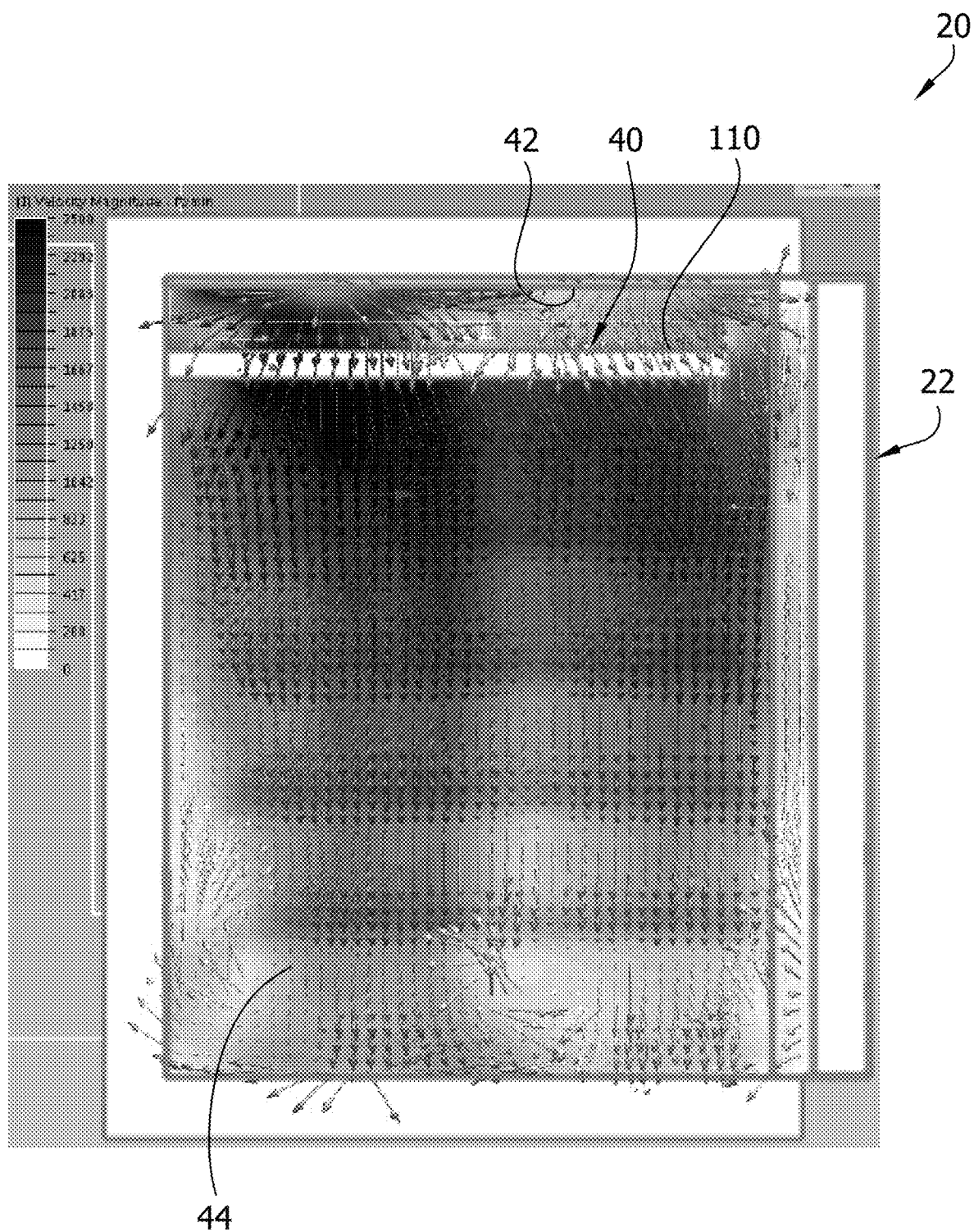
FIG. 12 is a section of the oven taken in a left side duct of the oven showing a gas velocity plot.
Figure 13:
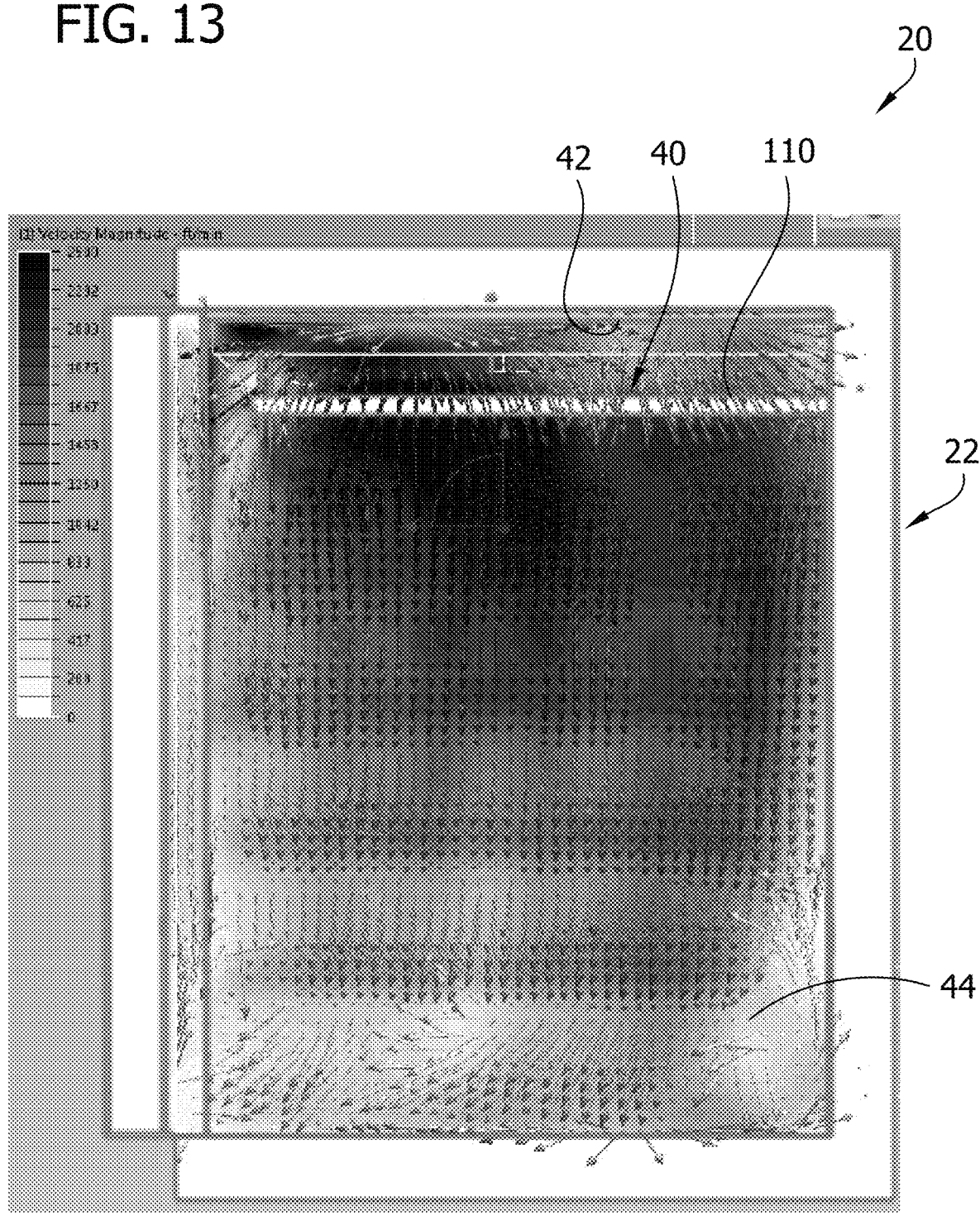
FIG. 13 is a section of the oven taken in a right side duct of the oven showing a gas velocity plot.

FIGS. 10-13 illustrate estimated gas velocity plots resulting from the configuration of the gas recirculation ducting 40 in the oven 20. Referring to FIG. 10, it will be appreciated that the configuration of the fan scroll housing 108 provides relatively uniform gas flow at the outlets of the fan discharge ducts 110. The hump wall sections 112B of the discharge ducts 110 assist in distributing or "fanning" gas flow across the outlets of the discharge ducts. In addition, the eddies caused by the eddy wall sections 114A of the discharge ducts 110 assist in distributing or "fanning" gas flow across the outlets of the discharge ducts. Referring to the right discharge duct 110 as an example, if the hump wall section 112B were omitted, gas flowing along the volute wall section 112A would tend to concentrate at the forward end of the discharge duct outlet downstream from the volute wall section. If the eddy wall section 114A were omitted, gas flowing along the rear discharge duct wall 114 would tend to concentrate at the rear end of the discharge duct outlet downstream from the rear cutoff 116. Accordingly, gas flow across a central portion of the discharge duct outlet would be substantially reduced relative to the forward and rear ends of the discharge duct outlet. As shown in FIG. 10, although there is central portion of the discharge duct 110 with reduced gas flow adjacent the outlet, the portion of reduced gas flow is substantially reduced in size, and overall gas flow between the front and rear portions of the discharge duct outlet is substantially more uniform. This assists in providing substantially uniform gas flow down the left and right ducts 44, as shown in FIGS. 12 and 13, and substantially uniform gas flow in the oven chamber 26, as shown in FIG. 11.

In another aspect of the oven, the heating system 60 is configured to reduce turbulence and gas flow restriction in the recirculation ducting 40 to assist in providing uniform gas flow. Referring to FIGS. 2 and 5-9, the heating mechanisms 62 are configured as turning vanes for turning flow of gas to follow the gas flow path of the recirculation ducting 40. The left heating mechanism 62 is positioned at the intersection of the left fan discharge duct 110 and the left side duct 44. The right heating mechanism 62 is positioned at the intersection of the right fan discharge duct 110 and the right side duct 44. The recirculation ducting 40 is free of heating mechanisms not configured as turning vanes, although such heating mechanisms could be provided without departing from the scope of the present invention.

Figure 7:
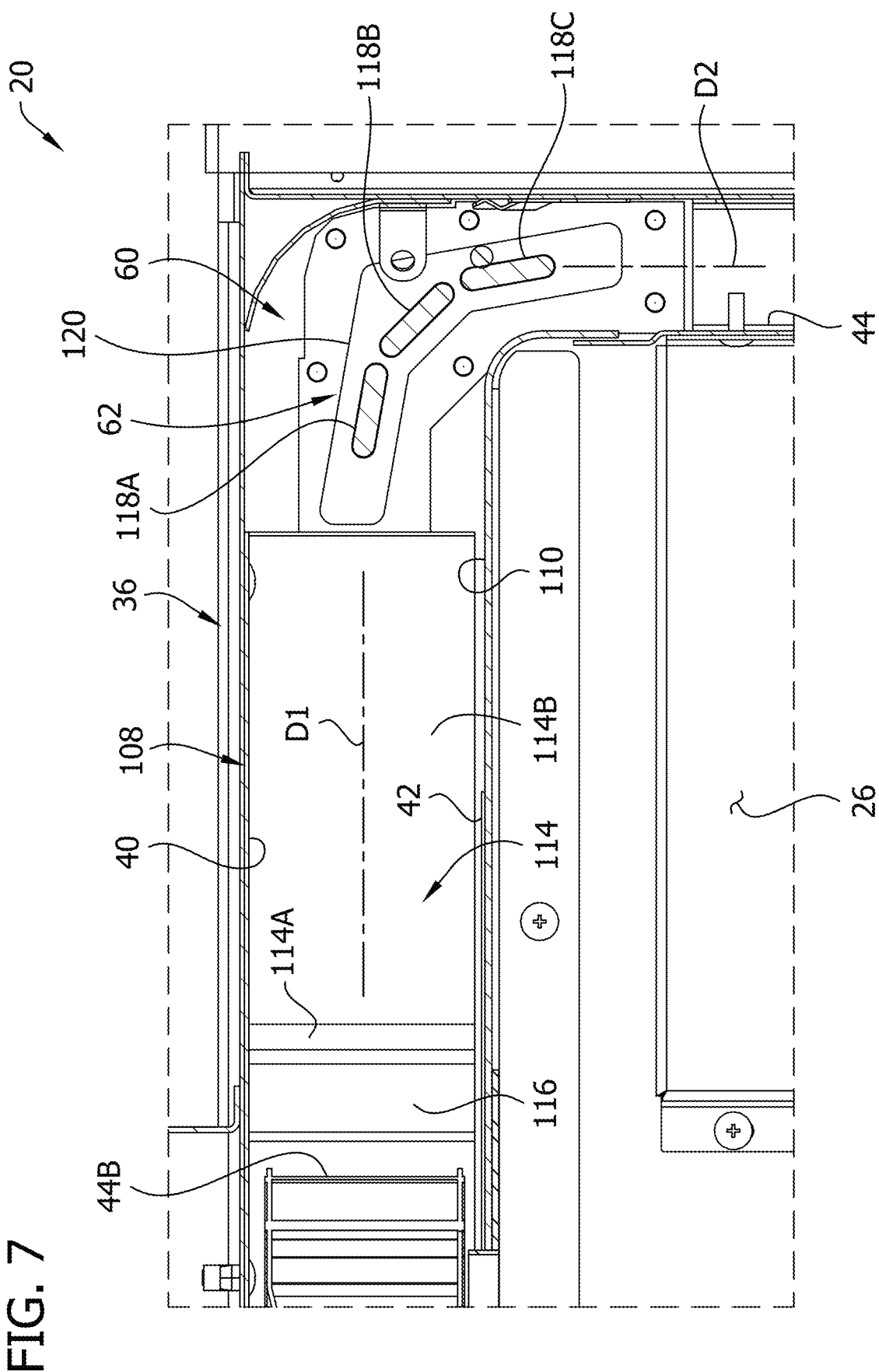
FIG. 7 is an enlarged fragmentary section of the oven taken in the plane 2-2 of FIG. 1 showing details of a heating mechanism of the oven.
Figure 8:
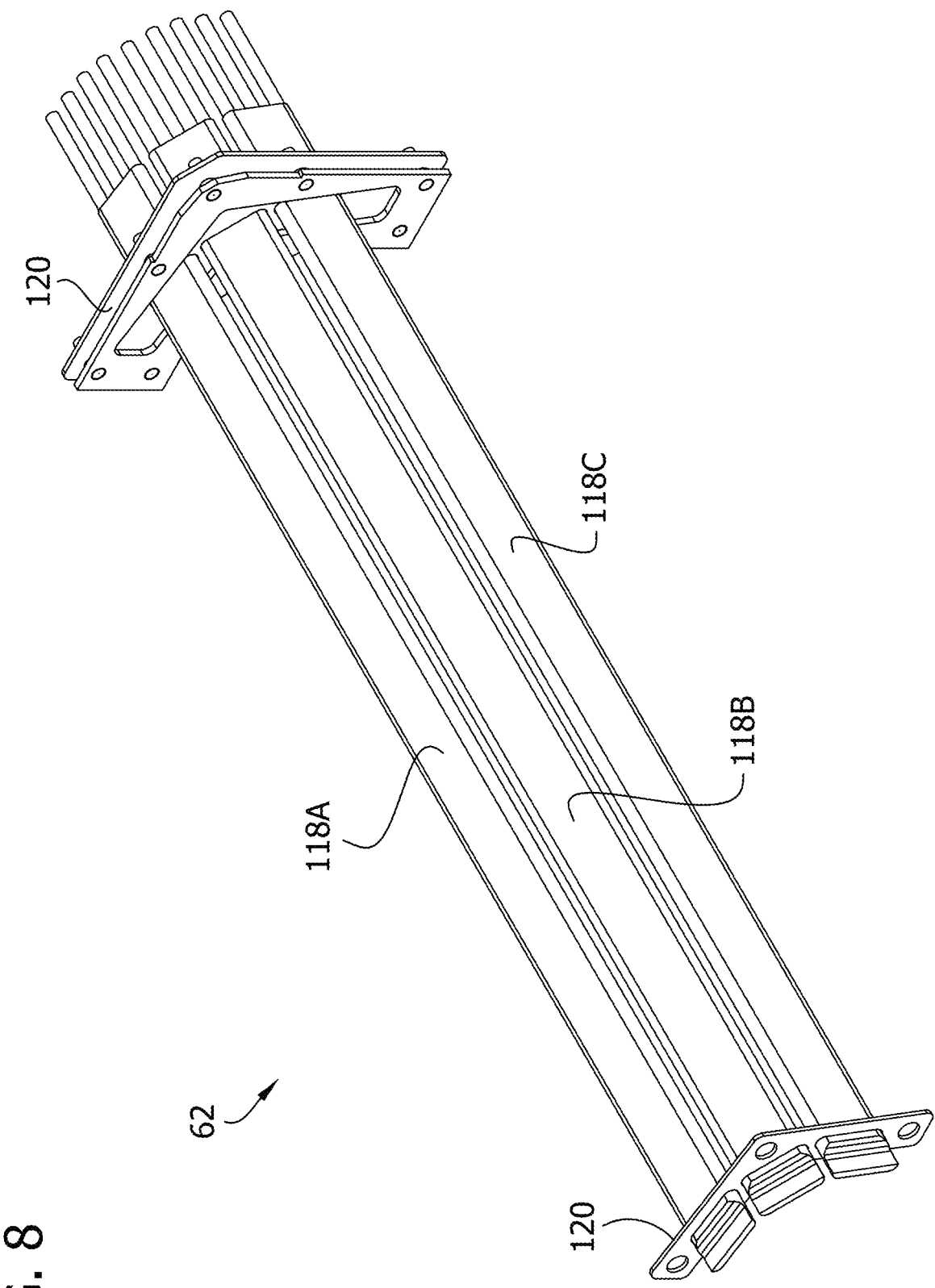
FIG. 8 is an enlarged perspective of the heating mechanism.
Figure 9:
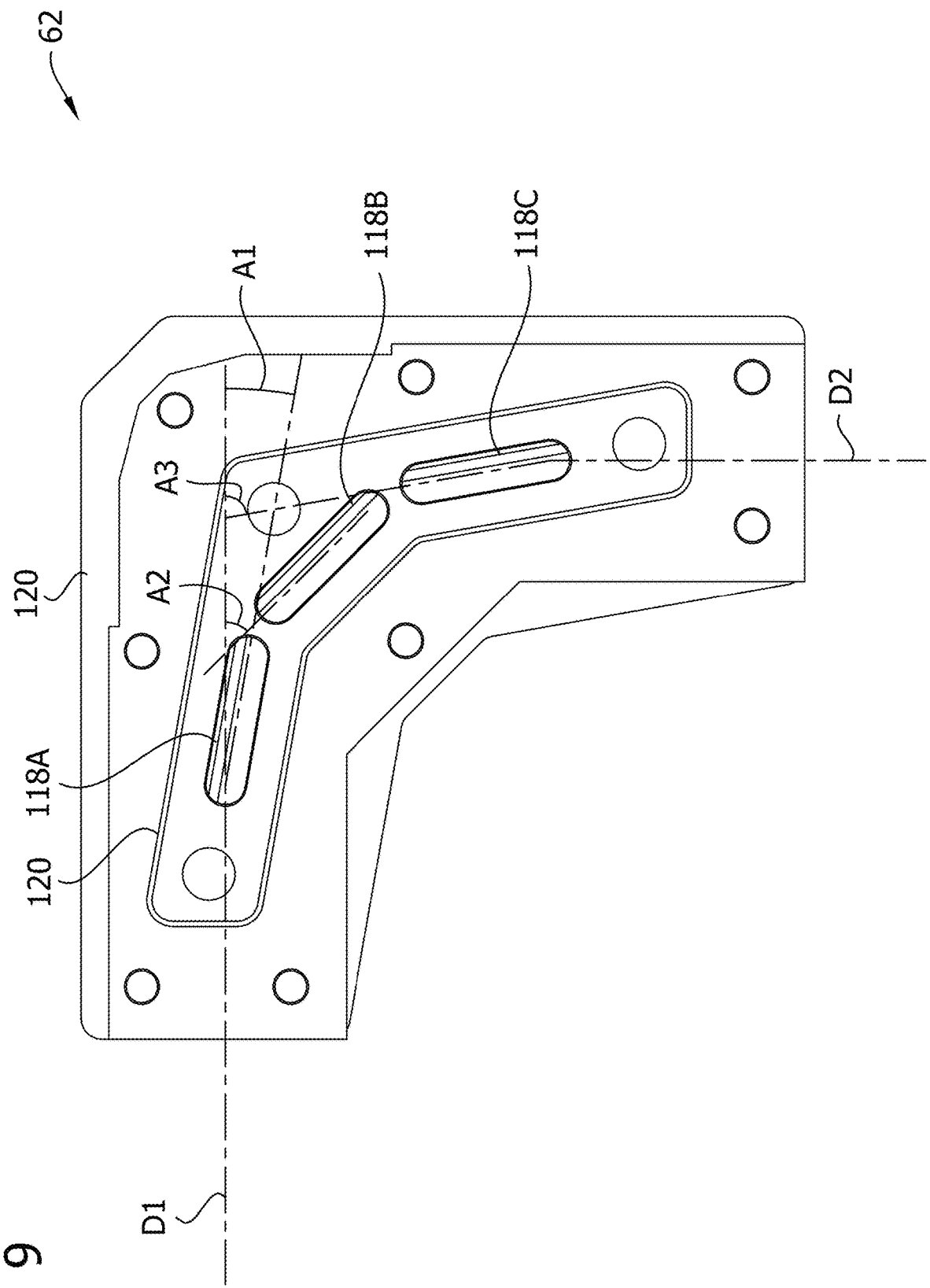
FIG. 9 is an enlarged elevation of the heating mechanism.

Referring to FIGS. 7-9, the right heating mechanism 62 is shown in closer detail. The right heating mechanism will be described with the understanding that the left heating mechanism is a mirror image thereof. The right heating mechanism 62 includes three heating elements 118A-118C. As shown in FIG. 8, the heating elements 118A-118C are supported with respect to each other by mounting structure 120 in the form of brackets adjacent opposite ends of the heating elements. In the illustrated embodiment, the heating elements 118A-118C are bar shaped heating elements having opposing generally flat surfaces. The bar shape of the heating elements 118A-118C provides them with non-circular cross-sectional shapes. The heating elements 118A-118C are exposed in the gas recirculation ducting 40 for directly heating gas flowing over the heating elements along the gas recirculation flow path. However, the turning vane 62 can include other turning structure and have one or more of the heating elements 118A-118C positioned for indirectly heating the gas flow without departing from the scope of the present invention.

The heating mechanism 62 is configured to assist in turning the gas flow from a first direction toward a second direction. As shown in FIG. 7, the recirculation gas flow path extends in a first direction D1 in the right side fan discharge duct 110, and the recirculation gas flow path extends in a second direction D2 transverse to the first direction in the right side duct 44. Although the first and second directions are illustrated as being perpendicular to one another, other transverse relationships (e.g., other angles) of the first and second directions can be used without departing from the scope of the present invention. For example, turning vane heating mechanisms according to the present invention can be configured to turn gas an angle of at least 20, 30, 40, 50, 60, 70, 80, 90, 100, 110, 120, 130, 150, etc. degrees from a first direction toward a second direction. In the illustrated embodiment, the heating elements 118A-118C are positioned one-after-another along the gas flow path such that the second heating element 118B is downstream from the first heating element 118A, and a third heating element 118C is downstream from the second heating element. The generally flat surfaces of the heating elements 118A-118C are oriented to be transverse to the first direction D1 to assist in turning the gas flow toward the second direction D2. As shown in FIG. 9, the first heating element 118A is configured for turning the gas flow a first degree A1 with respect to the first direction D1, the second heating element 118B is configured for turning the gas flow a second degree A2 with respect to the first direction, and the third heating element 118C is configured for turning the gas flow a third degree A3 with respect to the first direction. The heating elements 118A-118C turn the gas flow in successively greater degrees relative to the first direction D1 such that the second degree A2 is greater than the first degree A1, and the third degree A3 is greater than the second degree. For example without limitation, the first degree A1 can be in the inclusive range of 5-35 degrees, more desirably 5-25 degrees (e.g., about 10 degrees), the second degree A2 can be in the inclusive range of 30-60 degrees, more desirably 40-50 degrees (e.g., about 45 degrees), and the third degree A3 can be in the inclusive range of 55-85 degrees, more desirably 65-85 degrees (e.g., about 80 degrees), providing the turning vane with a cumulative turning degree of 55-85 degrees. It will be appreciated that other configurations of turning vanes comprising at least one heating element can be used without departing from the scope of the present invention. For example, more or fewer heating elements can be used, heating elements arranged at other angles (e.g., 0 degrees, 90 degrees, or therebetween, etc.) with respect to the first direction can be used, other arrangements of heating elements can be used, and heating elements having other shapes (e.g., curved) can be used. Turning vane heating mechanisms can be useful in a variety of scenarios, such as to assist in turning gas flow from a first direction toward a second direction having an angle of at least 20%.

Referring to FIGS. 11-13, it will be appreciated that the heating mechanisms 62 configured as turning vanes assist in providing uniform flow of gas down the left and right side ducts 44 from the left and right fan discharge ducts 110. Conventional heating mechanisms (e.g., heating mechanisms located closer to the fan) create turbulence and substantial flow restriction in gas recirculation flow paths. The turning vane heating mechanisms 62 of the present invention assist in providing less restricted and less turbulent gas flow. The gas flow impacting the turning vane 62 to turn the gas flow is useful in achieving heat transfer from the turning vane to the gas flow. The improved uniformity of the gas flow in the left and right side ducts 44 assists substantially in providing uniform gas flow in the oven chamber 26 from the front to the rear of the oven chamber. Accordingly, food in the oven chamber 26 is cooked more uniformly.

In another aspect of the oven, the heating system 60 includes heating elements of different wattages. For example, a heating element 118B of a first wattage can be used in a first cooking phase, and one or more heating elements 118A, 118C of a second wattage greater than the first wattage can be used in a second cooking phase. Referring again to FIG. 7, the second or middle heating element 118B of the right heating mechanism 62 is of the first wattage, and the first and third heating elements 118A, 118C of the right heating mechanism are of the second greater wattage. It will be understood the left heating mechanism 62 is of similar construction with the heating elements 118A-118C of different wattages. Heating elements of different wattages can be provided in other configurations (e.g., fewer or more heating elements, arranged differently, etc.) without departing from the scope of the present invention.

The oven 20 having heating elements 118A-118C of different wattages is facilitates execution of proofing and baking. In a proofing cycle, in which water is delivered to the recirculation ducting for forming steam, the second heating elements 118B having the first wattage are used and not the first and third heating elements 118A, 118C. For example, in the proofing stage, set points of 105 degrees F. and 90 percent relative humidity can be used. The wattage of the second heating elements 118B can be in the inclusive range of 800-1,200 watts, such as 1,000 watts. The relatively lower wattage of the heating elements 118B permits the heating elements to be energized more frequently and for longer time during the proofing cycle, which promotes more efficient change of the water to steam, with less likelihood of overshooting the temperature set point (less thermal inertia). In the proofing cycle, the set points can be 350 degrees F. and 0 percent relative humidity. For a baking cycle, at least the first and third heating elements 118A, 118C are energized. The wattage of the first and third heating elements 118A, 118C each can be in the inclusive range of 1,200-1,600 watts, such as 1,400 watts. The relatively higher wattage provides the heating elements 118A, 118C with power to achieve high temperature for baking. In the baking cycle, the second lower wattage heating elements 118B can be used for additional heat output if desired. For example, all six heating elements 118A-118C could provide a cumulative wattage of about 7600 watts.

As is now apparent, the oven 20 includes suitable components and systems such that the chamber 26 can be used for cooking various types of food. The oven can be programmed (e.g., the tangible storage medium 102 can have suitable instructions stored thereon) to execute various recipes. For example, the oven 20 can operate to execute a stored dough proofing cycle and/or a stored baking cycle. In some cases, the baking cycle can follow the proofing cycle for baking the proofed dough in the same oven chamber 26. The user interface 24 is adapted for permitting a user to program and execute various proofing and baking recipes.

The Title, Field of Invention, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field of Invention, and Background are not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A convection oven comprising:
a cabinet having a top, bottom, front, rear, left side, and right side,
an oven chamber in the cabinet sized for receiving food,
recirculation ducting for recirculating gas from the oven chamber back to the oven chamber, the recirculation ducting including a fan scroll housing,
a centrifugal fan in the fan scroll housing for moving gas from the recirculation ducting to the oven chamber, the centrifugal fan having a fan axis about which the fan is rotatable in a rotation direction to move gas radially from the fan in the fan scroll housing, and
a heating mechanism in the cabinet for heating the gas,
wherein the fan scroll housing includes multiple fan discharge ducts defining respective gas flow paths from the fan, the fan scroll housing defining multiple cutoffs adjacent the fan for dividing gas flow from the fan to said fan discharge ducts, each fan discharge duct including opposite first and second discharge duct walls downstream from respective cutoffs, each first discharge duct wall including a volute wall section having a concave surface facing the gas flow path of the respective fan discharge duct, and each volute wall section extending at least partially around the centrifugal fan in the rotation direction and increasing in distance from the fan axis as the volute wall section extends in the rotation direction around the centrifugal fan,
wherein each second discharge duct wall includes an eddy wall section configured to create an eddy in the gas flow path.

2. The convection oven as set forth in claim 1, wherein each first discharge duct wall includes a hump wall section downstream from the volute wall section, each hump wall section bulging inward with respect to the gas flow path of the respective fan discharge duct.

3. The convection oven as set forth in claim 2, wherein each hump wall section has a convex surface facing the gas flow path of the respective fan discharge duct.

4. The convection oven as set forth in claim 3, wherein the convex surface of the hump wall section has a curved peak facing the gas flow path of the respective fan discharge duct.

5. The convection oven as set forth in claim 2, wherein each eddy wall section has a concave surface facing the gas flow path of the respective discharge duct.

6. The convection oven as set forth in claim 2, wherein each second discharge duct wall includes a diffuser wall section downstream from the eddy wall section extending away from the eddy wall section and the hump wall section.

7. The convection oven as set forth in claim 2, wherein each second discharge duct wall includes a diffuser wall section extending away from the fan and the hump wall section.

8. The convection oven as set forth in claim 1, wherein each eddy wall section has a concave surface facing the gas flow path of the respective discharge duct.

9. The convection oven as set forth in claim 1, wherein each second discharge duct wall includes a diffuser wall section downstream from the eddy wall section extending away from the eddy wall section and the first discharge duct wall.

10. The convection oven as set forth in claim 1, wherein the multiple fan discharge ducts comprise a left fan discharge duct and a right fan discharge duct, and the recirculation ducting further comprises left and right ducts downstream from the respective left and right fan discharge ducts, the left and right ducts being positioned to respective left and right sides of the oven chamber for delivering gas to the left and right sides of the oven chamber.

11. The convection oven as set forth in claim 10, wherein the fan scroll housing is above the oven chamber.

12. A convection oven comprising:
a cabinet having a top, bottom, front, rear, left side, and right side,
an oven chamber in the cabinet sized for receiving food,
at least one outlet for delivering gas to the oven chamber,
at least one exhaust for exhausting gas from the oven chamber,
recirculation ducting defining a recirculation gas flow path for flow of gas from the at least one exhaust to the at least one outlet for recirculating gas from the oven chamber back to the oven chamber,
a fan in the recirculation ducting for moving gas along the recirculation gas flow path, and
at least one turning vane in the recirculation ducting, the turning vane being configured for turning gas flow in the recirculation ducting from a first direction toward a second direction transverse to the first direction for following the gas flow path, the turning vane comprising a heating mechanism for heating gas in the recirculation ducting.

13. The convection oven as set forth in claim 12, wherein the recirculation ducting includes a first duct and a second duct downstream from the first duct, the gas flow path extending in the first duct in the first direction, the gas flow path extending in the second duct in the second direction, the turning vane being positioned at an intersection of the first and second ducts for turning gas flowing from the first duct to the second duct.

14. The convection oven as set forth in claim 13, wherein the fan is positioned in the first duct.

15. The convection oven as set forth in claim 14, wherein the second duct is a side duct positioned left of or right of the oven chamber.

16. The convection oven as set forth in claim 15, wherein the first duct is above the oven chamber.

17. The convection oven as set forth in claim 12, wherein the heating mechanism comprises at least first and second heating elements, the second heating element being positioned downstream from the first heating element, the first heating element being configured for turning the gas flow a first degree relative to the first direction, and the second heating element being configured for turning the gas flow a second degree relative to the first direction greater than the first degree.

18. The convection oven as set forth in claim 17, wherein the heating mechanism further comprises a third heating element, the third heating element being positioned downstream from the second heating element, the third heating element being configured for turning the gas flow a third degree relative to the first direction greater than the second degree.

19. The convection oven as set forth in claim 12, wherein the heating mechanism comprises at least one heating element, the at least one heating element having a non-circular cross-sectional shape.

20. The convection oven as set forth in claim 19, wherein the at least one heating element has at least one generally flat surface oriented transverse to the first direction for turning the gas flow.

21. The convection oven as set forth in claim 13, wherein the intersection of the first and second ducts is a corner, the turning vane disposed at the corner for turning gas flowing from the first duct to the second duct around the corner.

22. The convection oven as set forth in claim 13, further comprising at least one second turning vane in the recirculation ducting, the second turning vane being configured for turning gas flow in the recirculation ducting from a third direction toward a fourth direction transverse to the third direction for following the gas flow path, the second turning vane comprising a heating mechanism for heating gas in the recirculation ducting; and wherein the recirculation ducting includes a third duct and a fourth duct downstream from the third duct, the gas flow path extending in the third duct in the third direction, the gas flow path extending in the fourth duct in the fourth direction, the second turning vane being positioned at an intersection of the third and fourth ducts for turning gas flowing from the third duct to the fourth duct.

23. The convection oven as set forth in claim 22, wherein the intersection of the third and fourth ducts is a corner, the second turning vane disposed at the corner for turning gas flowing from the third duct to the fourth duct around the corner.

24. The convection over as set forth in claim 22, wherein the first and third directions are generally opposite of each other and the second and fourth directions are generally parallel to each other.

* * * * *